US007258627B2

(12) United States Patent
Chappell

(10) Patent No.: US 7,258,627 B2
(45) Date of Patent: Aug. 21, 2007

(54) HIGH SPIN GOLF CLUB GROOVE CONFIGURATION

(75) Inventor: Chris Chappell, Westminster, SC (US)

(73) Assignee: TaylorMade-Adidas Golf Company, Carlsbad, CA (US)

( * ) Notice: Subject to any disclaimer, the term of this patent is extended or adjusted under 35 U.S.C. 154(b) by 0 days.

(21) Appl. No.: 11/152,665

(22) Filed: Jun. 13, 2005

(65) Prior Publication Data

US 2006/0003851 A1 Jan. 5, 2006

Related U.S. Application Data

(62) Division of application No. 10/012,580, filed on Dec. 4, 2001, now Pat. No. 6,981,923.

(60) Provisional application No. 60/258,444, filed on Dec. 27, 2000.

(51) Int. Cl.
*A63B 53/04* (2006.01)

(52) U.S. Cl. ...................................... 473/331; 473/331

(58) Field of Classification Search ........ 473/330-331; D21/747, 750, 751, 759
See application file for complete search history.

(56) References Cited

U.S. PATENT DOCUMENTS 4,413,825 A * 11/1983 Sasse ......................... 473/331
4,754,971 A * 7/1988 Kobayashi .................. 473/290
4,858,929 A * 8/1989 Long .......................... 473/290
5,029,864 A * 7/1991 Keener ....................... 473/331
5,090,702 A * 2/1992 Viste .......................... 473/331
5,437,088 A * 8/1995 Igarashi ..................... 29/527.6
5,595,547 A * 1/1997 Lekavich .................... 473/287
5,618,239 A * 4/1997 Rife ........................... 473/330
5,688,186 A * 11/1997 Michaels et al. ........... 473/290
5,709,616 A * 1/1998 Rife ........................... 473/330
5,766,087 A * 6/1998 Kawamatsu ................ 473/290
6,299,548 B1 * 10/2001 Lin ........................... 473/331
6,398,665 B1 * 6/2002 Antonious .................. 473/330
6,981,923 B2 * 1/2006 Chappell .................... 473/330

* cited by examiner

*Primary Examiner*—Sebastiano Passaniti
(74) *Attorney, Agent, or Firm*—Lorusso & Associates

(57) ABSTRACT

The high spin golf club uses modified grooves for use on all types of known golf clubs, wherein the modified grooves maximizes control of the golf ball through increasing back-spin. The high spin golf club's modified grooves can be used alone or in a combination with conventional grooves to tailor the properties of the club face. The modified grooves are of varied configurations and all modified grooves can be used in combination with any other modified or conventional grooves to maximize the backspin of the golf ball and tailor the spin properties of the face of the club. Further a method for making high backspin golf clubs that reduce cover damage of golf balls is disclosed.

19 Claims, 10 Drawing Sheets

6 2 16 14 4 10 12 18 8

16 68 21 66 19 17

3
60
16
R
7
5

HIGH SPIN GOLF CLUB GROOVE CONFIGURATION

CROSS REFERENCE TO RELATED APPLICATIONS

This application is a divisional of U.S. application Ser. No. 10/012,580 filed Dec. 4, 2001, now U.S. Pat. No. 6,981,923, issued Jan. 3, 2006 that claims the benefit of U.S. Provisional Application No. 60/258,444 filed Dec. 27, 2000, the entire contents of both are incorporated herein by reference.

BACKGROUND OF THE INVENTION

The present invention relates to the grooves formed across the club face of golf clubs including irons, drivers, woods and particularly wedges, and to a set of modified groove configurations.

Golf club wedges are usually designed with varying degrees of loft generally ranging from a minimum of about 48 degrees to a maximum of about 64 degrees. The varying degrees of loft help to control the trajectory and distance a golf ball will travel.

In play, especially with the higher numbered irons and wedges, control is obtained in part by means of backspin. At the time of impact, the golf ball is contacted against the club face with substantial deformation. Control of the ball in flight is partly exercised by backspin, and more control is obtained on the initial bounce (i.e., the ball will "bite" or hold the surface better after the initial bounce) when the ball has the proper backspin. Thus, the higher the rate of backspin, the greater the control.

To achieve backspin, multiple grooves are cut across the club face of a golf club. These groves grip the ball momentarily upon impact as it is driven, which in turn generates backspin on the ball. By and large, the most popular and common groove configurations employed today are the V-shape and square shape. Although these conventional configurations succeed in creating backspin, it is desirable to impart more spin to golf balls so that greater control can be achieved.

SUMMARY OF THE INVENTION

Thus, it is an object of the present invention to generate a higher rate of backspin on a driven golf ball thereby enabling the ball to better grip and hold the playing surface.

It is a further object of the present invention to provide golf clubs including irons, drivers, woods and particularly wedges that will provide a golfer with greater control over a golf ball.

Accordingly, the present invention achieves the objectives set forth above by providing at least one modified groove, a modified groove in combination with conventional grooves, or preferably a set of modified groove configurations comprising angled slots, angled slots with double chamfers, Y-shaped slots and circular portions. Each configuration is adaptable to all golf clubs including irons, drivers, woods, and particularly wedges. Each groove is cut repetitively and is arranged for taking a better grip on the ball. The grooves are provided with three primary surfaces, which define said grooves. A contact face is at the low side of the groove. Contact with the golf ball is primarily on the club face with the contact face achieving some additional contact so that a better grip is taken at the instant of impact. This enhanced grip induces more backspin on the ball which in turn provides more control over the ball when it lands on the playing surface (i.e., the ball will hold the playing surface better after its initial bounce).

The above and other features of the invention, including various novel details of construction and combination of parts, will now be more particularly discussed with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention from which its novel features will be apparent.

In the drawing.

DETAILED DESCRIPTION OF THE INVENTION

The present disclosure applies to wedges, but is adaptable to all other golf clubs including irons, drivers and woods. The groove design of this invention is ideal for extending the life of golf balls through the reduction of damage from the clubs design. The design allows for maximum golf ball performance by increasing spin, while simultaneously reducing cover damage of the golf ball. While manufacturers of golf balls constantly searched for ways of increasing golf ball life, they ignored the main cause of early golf ball failure, the design of the club face, specifically the grooves.

Figure 4:
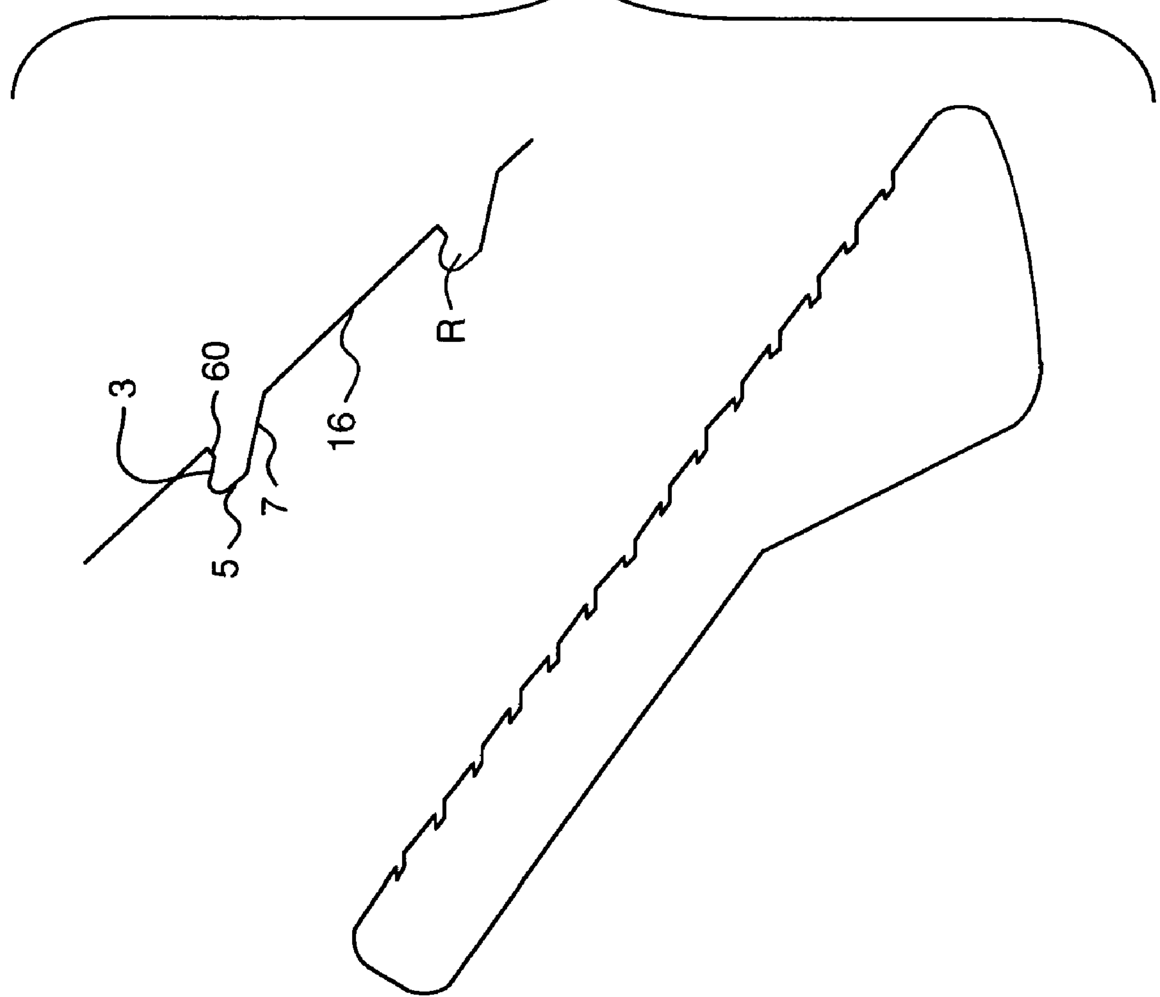
FIG. 4 shows a sectional view of an "A" groove or angled slot configuration for a 48 to 64 degree wedge according to one embodiment of the invention.

A method for preventing the damage to a golf ball from a golf club, while increasing the performance of the club relates to reduction of sharp angled grooves that hit the cover of the golf ball at the point formed. The method requires that the leading edge side of the groove be an effective obtuse angle and the trailing edge side of the groove form no greater than a 90 degree angle with club face 16, though it is preferably an obtuse angle also. A leading edge of a groove is the side of the groove closest to the top ridge 6 of the club. The trailing edge of the groove can be defined as the side of the groove closest to the bottom sole portion 8 of the club. FIG. 4 provides an example of the method applied as typified by the edge of the groove formed between second surface 7 and club face 16, form a leading edge of the groove, which is greater than 90 degrees, more preferably form angles of 110 to 150 degrees to club face 16. This does not apply to what at first look could be described as the acute edge formed by chamfered edge 60, which because of the angling of the club face, this trailing edge need not be limited to an obtuse angle, though obtuse angles are preferred for both sides of the groove the contacts club face 16. Still even though chamfered edge 60 is trailing edge groove side it has been chamfered so that it is effectively forms no greater than a 90-degree angle with the club face 16.

Thus a conventional groove, with both grooves being perpendicular to the club face forms a sharp edge, the sharp edge grips the cover forming a minute cut, eventually destroying the cover of the ball. Other more aggressive prior art clubs have leading edge grooves forming angles even less than 90 degrees, leading to even faster ball cover destruction than conventional grooves.

Figure 1:
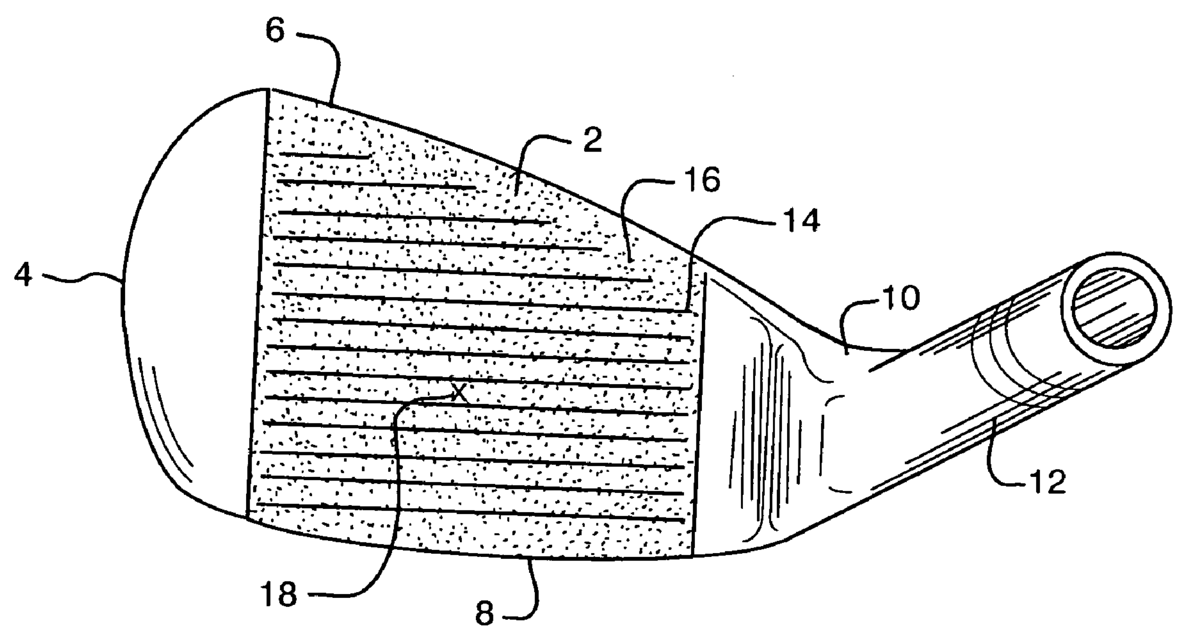
FIG. 1 shows a front view of a wedge clubhead according to one embodiment of the invention.
Figure 2:
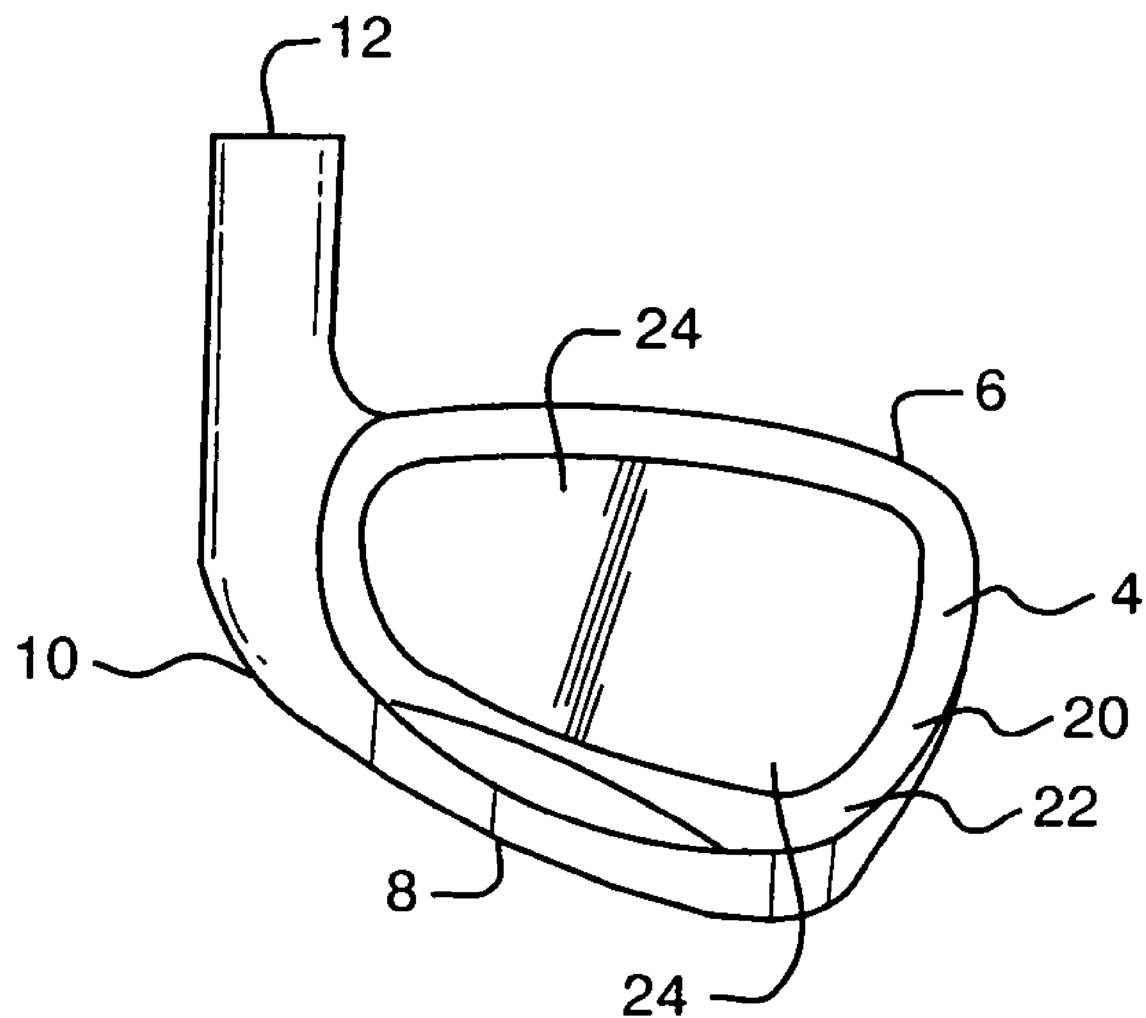
FIG. 2 shows a back view of a wedge with an optional cavity according to one embodiment of the invention.

Referring to the drawing, and particularly FIGS. 1 and 2, it will be seen that the illustrative golf clubhead of one embodiment includes a blade member 2 having a toe portion 4, a top ridge 6, a bottom sole portion 8 and a heel portion 10. Extending from the heel portion region of the clubhead is a hosel portion 12 adapted to receive and be retained on a shaft member (not shown).

The club head is provided with preferably a substantially flat surface or club face 16, but the club face is not limited to being flat, having therein a center of percussion 18, which is the spot ideally adapted to engage a golf ball at impact, and a rear surface 20 having a perimeter 22 defining an optional cavity 24. Cut into the club face 16 are a series of grooves 14 that are arranged in parallel and are uniformly spaced in relation to one another in accordance with one embodiment of the invention; however, in a different embodiment, said grooves can be spaced non-uniformly and/or can be arranged in a non-parallel fashion. The number of grooves 14 can vary, but a typical number across the club face ranges from at least one to about twenty grooves.

Before a groove is cut into the club face, the club face may be preferably milled perfectly flat, thereby removing any and all variations in face flatness. In addition, the milled club face may be finished or treated. Once the work on the club face is completed, each individual groove is typically engraved into the club face one at time but they may be molded or stamped depending on the process of manufacture chosen.

It should be noted that all of the groove configurations described herein apply to the full range of wedges (48 to 64 degree), as well as to all other golf clubs including irons, drivers and woods and any other known or future discovered golf clubs. Furthermore, in all groove configurations described below, the individual grooves in each configuration may be spaced 0.05 to 0.2 inch apart, more preferably 0.1 to 0.15 inches, most preferably about 0.105 inch apart.

Figure 3:
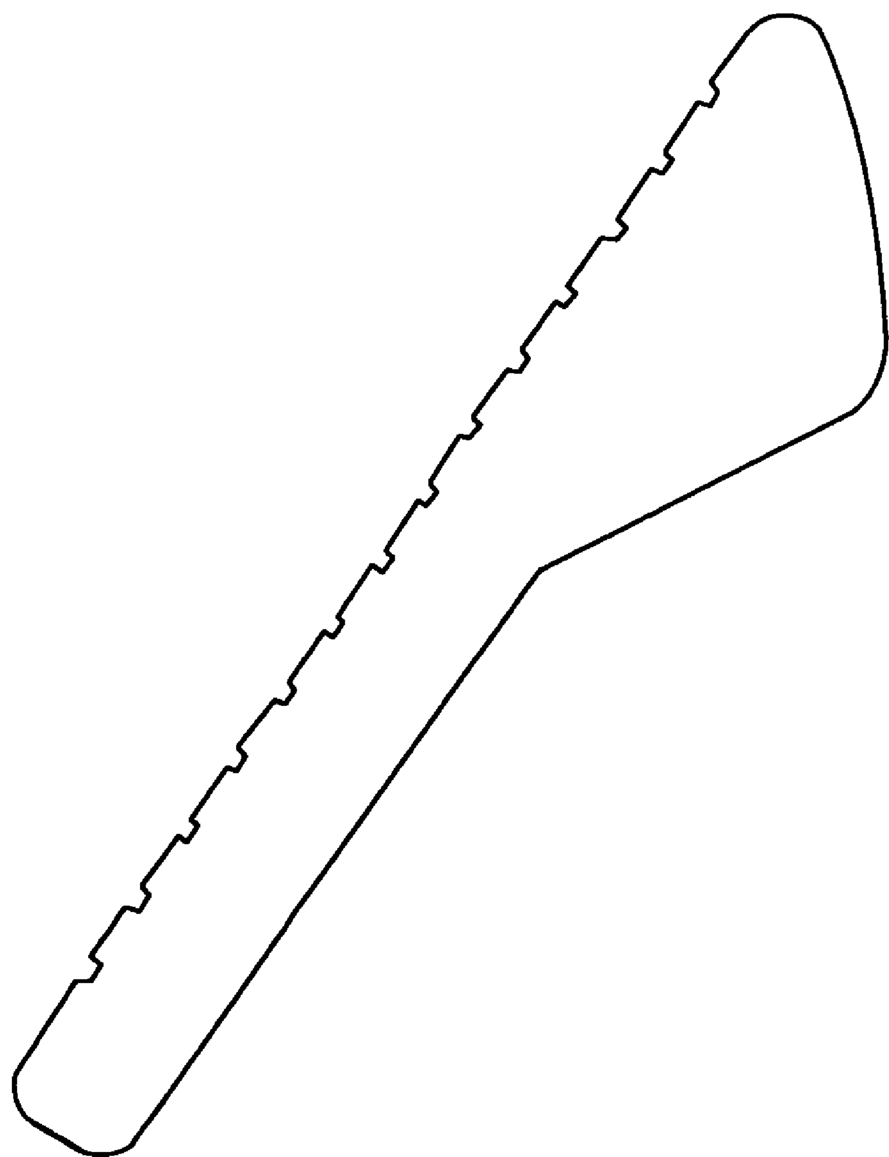
FIG. 3 shows a cross-sectional view of a wedge with a conventional square groove configuration according to one embodiment of the invention.

FIG. 3 illustrates a conventional square groove configuration with horizontal score lines. The modified groove may be combined with the conventional grooves to tailor the reaction of the golf ball to the point of contact on the club face (not shown). An example would be to surround a central grouping of modified grooves with conventional grooves or the opposite depending on the characteristics that you desire to tailor to the club face.

In comparison, FIG. 4 shows an angled slot groove configuration, more particularly, an “A” version of said angled slot groove configuration in accordance with one embodiment of the present invention. Referring to the enlarged exploded portion of FIG. 4, said “A” version of said angled slot groove configuration comprises at least one groove or a series of grooves, each formed by a first surface 3 connected to the club face 16 via a chamfered edge 60; a second surface 7 extending between a third surface 5 and the club face 16 wherein third surface 5 connects said first surface 3 to said second surface 7. Said third surface 5 can be either parallel or non-parallel with respect to the club face 16.

The angle of the first surface 3 and the second surface 7 with respect to the club face 16 is effective for improving backspin (i.e., increasing backspin) on a golf ball in the ranges of: 0 to 180 degrees, 20 to 160 degrees, 40 to 140 degrees, 60 to 120 degrees, 80 to 100 degrees 0 to 90 degrees and 90 to 180 degrees. Most particularly, the effective range is 20 to 50 degrees, the most preferable angle therein being about 35 degrees. Said first surface 3 and said second surface 7 are not both parallel to each other and perpendicular to the club face 16 simultaneously.

The opening of each individual groove with respect to the club face 16 (i.e., the width of the groove or distance between surface 3 and surface 7 at the club face 16) is in the range of 0.015 to 0.055 inch; most particularly said distance is about 0.035 inch. The outer edges of surfaces 3 and 7 interface to form a gripping edge which imparts spin on the ball. As discussed above this can be combined with conventional grooves or with other modified grooves to tailor the reaction of the ball according to its contact point with the face of the club.

Additionally, the depth of each individual groove measured from the club face can range from 0.01 to 0.03 inch, with a preferable depth of 0.02 inch.

Figure 5:
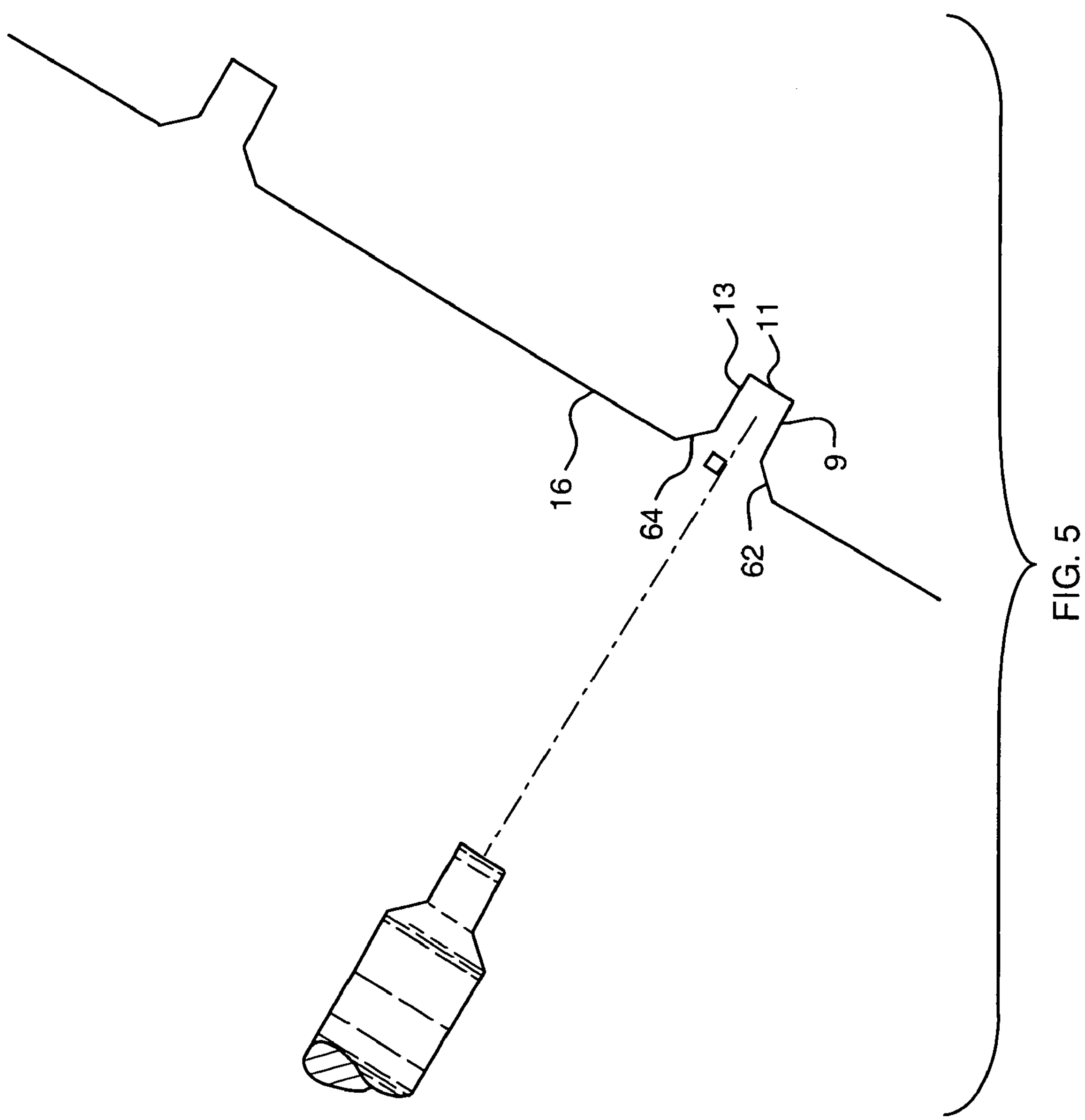
FIG. 5 shows a sectional view of a "B" groove or Y-shaped slot configuration for a 48 to 64 degree wedge according to one embodiment of the invention.

FIG. 5 shows a sectional view of a Y-shaped slot groove configuration, more particularly, a “B” version of said Y-shaped slot groove configuration in accordance with one embodiment of the present invention. Said groove configuration is made up of at least one Y-shaped slot or a series of y-shaped slots wherein each Y-shaped slot is formed by three surfaces 9, 11 and 13. First surface 9 and second surface 13 are connected to the club face 16 via a first chamfered edge 62 and a second chamfered edge 64 respectively. First surface 9 and second surface 13 are parallel to each other and perpendicular to the club face simultaneously. A third surface 11 extends between the first surface 9 and the second surface 13 and can be either parallel or non-parallel with respect to the club face 16. Surfaces 9,13 in combination with chamfered edges 62,64 and club face 16, form a gripping edge that imparts spin on the ball when contact is made.

The location where said first chamfered edge 62 connects to said first surface 9 and where said second chamfered edge 64 connects to said second surface 13 is effective for improving backspin on a golf ball (i.e., increasing backspin) in the ranges of 0.00125 to 0.00875 inch and 0.0025 to 0.0075 inch below the club face 16. Most particularly, the effective range is 0.00375 to 0.00625 inch below the club face 16, the most preferable location being about 0.005 inch below the club face 16.

Surfaces 9,11,13 form a rectangular portion of the Y-shaped slot. Said rectangular portion is about 0.01 to 0.026 inch wide, most particularly being about 0.018 inch wide. The width of the Y-shaped slot measured at the club face 16 ranges from 0.015 to 0.055 inch, most particularly, said width is 0.035 inch. The maximum depth of each groove measured from the club face 16 can range from 0.01 inch to 0.03 inch, with a preferable depth of 0.02 inch.

One method of determining the configuration of the Y-shaped slot is by the depth of the groove. A good method to determine the shape of Y groove, is where said first chamfered edge 62 connects to said first surface 9 and where said second chamfered edge 64 connects to said second surface 13, by calculating it to be 10-40% of the depth of the bottom of the groove, more preferably 20-30% of the depth with 25% being a typical selection. This configuration can be cut using a custom ground end mill or stamped or molded depending on the process used. This groove may be used alone or combined with other grooves to tailor the performance of the club.

Figure 6:
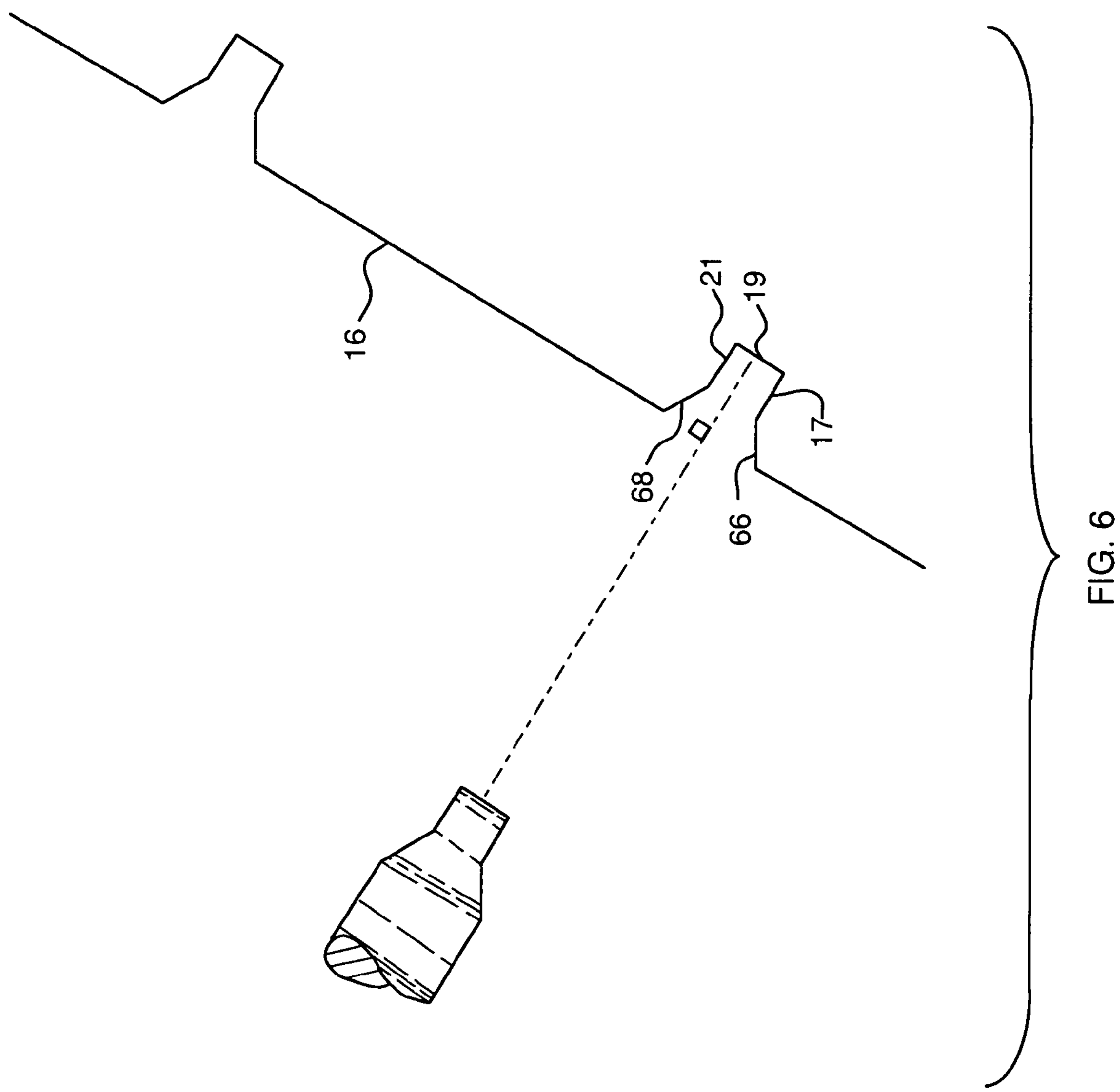
FIG. 6 shows a sectional view of a "C" groove or Y-shaped slot configuration for a 48 to 64 degree wedge according to one embodiment of the invention.

FIG. 6 shows a sectional view of a Y-shaped slot groove configuration, more particularly, a "C" version of said Y-shaped slot groove configuration in accordance with one embodiment of the present invention. Said Y-shaped slot configuration is made up of at least one Y-shaped slot or a series of Y-shaped slots each formed by three surfaces 17, 19 and 21. First surface 17 and second surface 21 are connected to the club face 16 via a first chamfered edge 66 and a second chamfered edge 68 respectively thereby forming a gripping surface. First surface 17 and second surface 21 are parallel to each other and perpendicular to the club face simultaneously. A third surface 19 extends between the first surface 17 and the second surface 21 and can be either parallel or non-parallel with respect to the club face 16.

The location where said first chamfered edge 66 connects to said first surface 17 and where said second chamfered edge 68 connects to said second surface 21 is effective for improving backspin on a golf ball (i.e., increasing backspin) in the ranges of 0.005 to 0.015 inch, 0.00625 to 0.01375 inch and 0.0075 to 0.0125 inch below the club face 16. Most particularly, the effective range is 0.00875 to 0.01125 inch below the club face 16, the most preferable location being about 0.01 inch below the club face 16.

Surfaces 17,19,21 form a rectangular portion of the Y-shaped slot. Said rectangular portion is about 0.01 to 0.026 wide, most particularly being about 0.018 inch wide. The width of the Y-shaped slot measured at the club face 16 ranges from 0.015 to 0.055 inch, most particularly, said width is 0.035 inch.

The maximum depth of each groove measured from the club face 16 can range from 0.01 inch to 0.03 inch, with a preferable depth of 0.02 inch. One method for determining the configuration of the groove is to define where the first chamfered edge 66 connects to said first surface 17 and where said second chamfered edge 68 connects to said second surface 21 as a percentage of the depth of the groove. This groove is ideally from 40-70% of the depth, more preferably 45-55%, with a depth of 50% being one common embodiment. This configuration can be cut using a custom ground end mill, stamped or molded depending on the process chosen. Additionally the grooves may be used alone or in combination with other modified grooves or conventional grooves.

Figure 7:
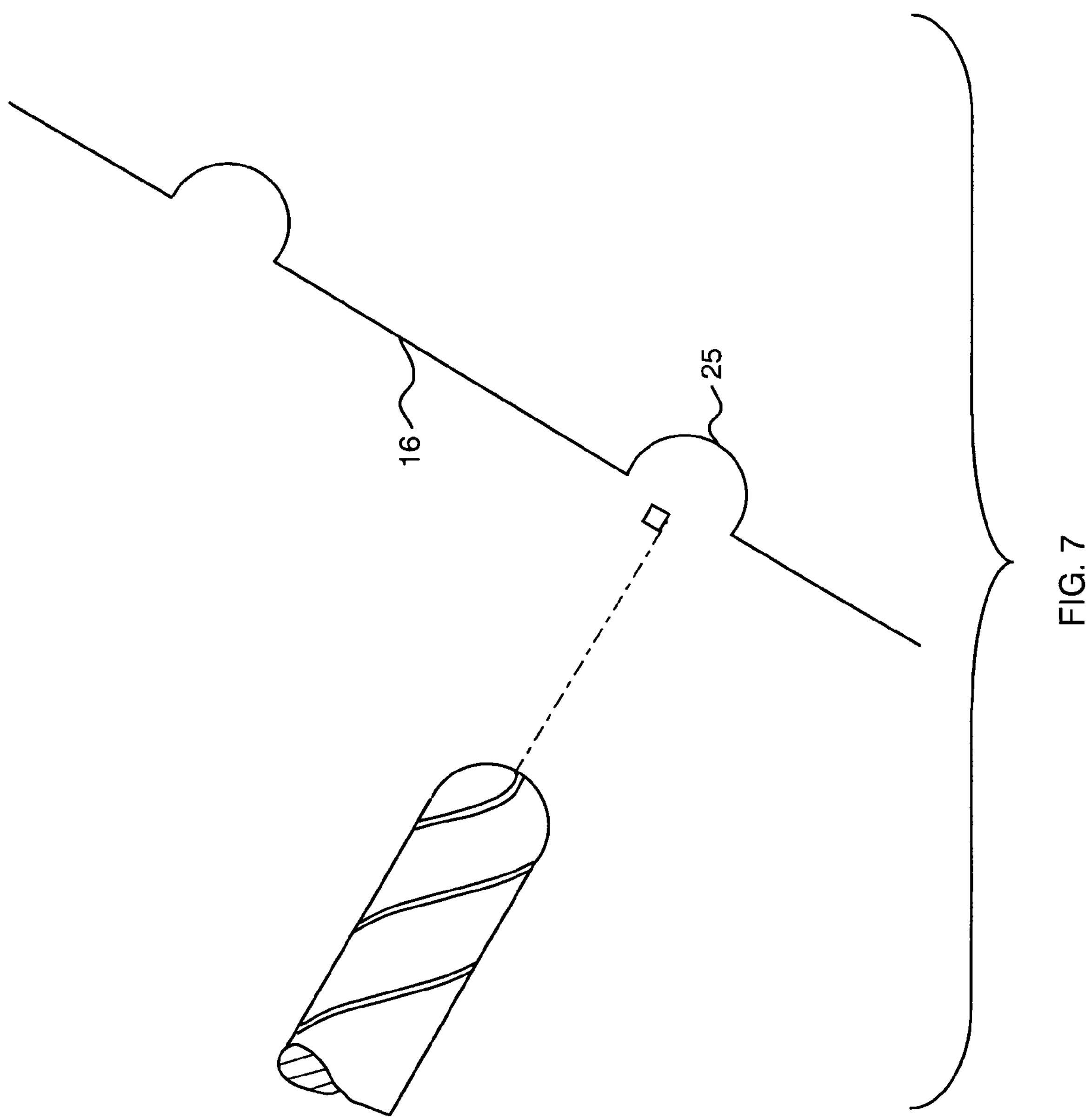
FIG. 7 shows a sectional view of a "D" groove or circular portion configuration for a 48 to 64 degree wedge according to one embodiment of the invention.

FIG. 7 shows yet another groove configuration, wherein said configuration comprises a portion of circle or arc shaped groove(circular portion). More specifically, FIG. 7 illustrates a "D" version of said groove configuration, which displays a circle, wherein at least one or a series of grooves formed in the club face 16 comprises a portion of a circle or ellipsoid or arc 25. A gripping edge or surface is formed where the opposite ends of said circular portion connect to the club face 16. The radius of the arc may be modified at any portion between its maximum and minimum range throughout the groove modifying a circle into an ellipse or an arc. An effective radius of said circular or arc portion 25 for improving backspin on a golf ball (i.e., increasing backspin) ranges from 0.008 to 0.026 inch. More particularly, the effective range is 0.013 to 0.021 inch, the most preferable radius being 0.017 inch. Additionally, the maximum depth of said portion of a circle or arc 25 measured from the club face 16 ranges from 0.01 to 0.03 inch, with a preferred maximum of 0.02 inch. Furthermore, the maximum width of said portion of a circle/arc groove measured at the club face ranges from 0.015 inch to 0.055 inch, with a preferable maximum width of 0.035 inch. This configuration can be cut using a custom ground ball nose.

Figure 8:
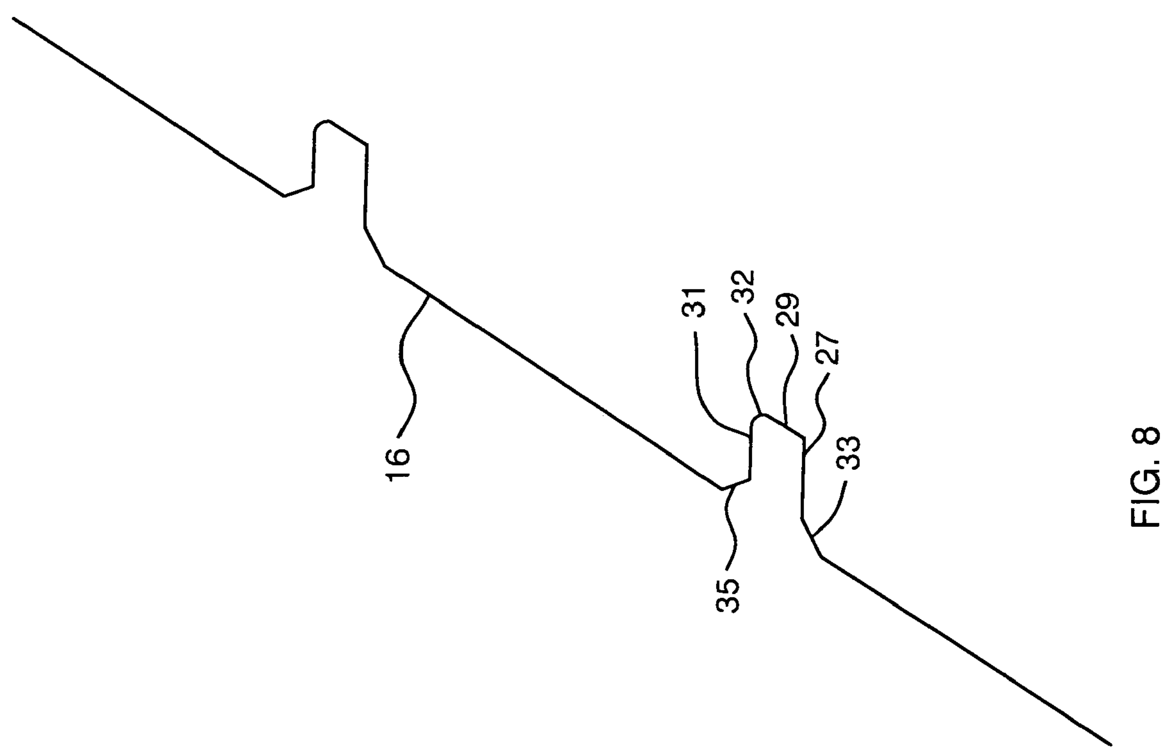
FIG. 8 shows a sectional view of an "E" groove or angled slot with double chamfer configuration for a 48 to 64 degree wedge according to one embodiment of the invention.
Figure 9:
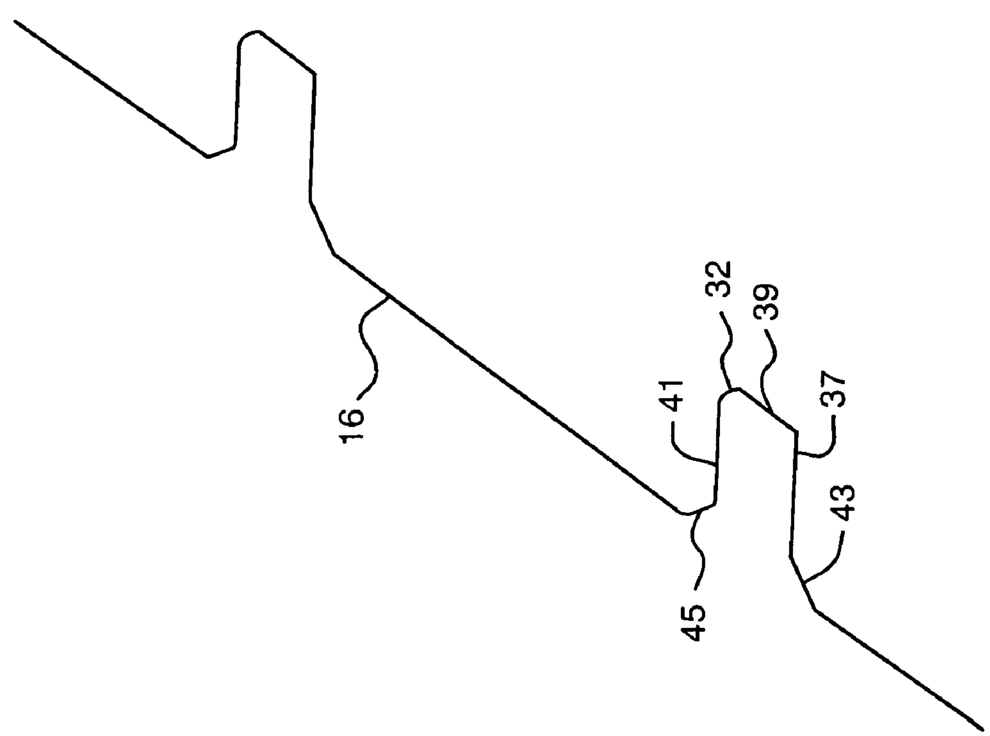
FIG. 9 shows a sectional view of an "E" groove or angled slot with double chamfer configuration for a 48 to 64 degree wedge according to another embodiment of the invention.
Figure 10:
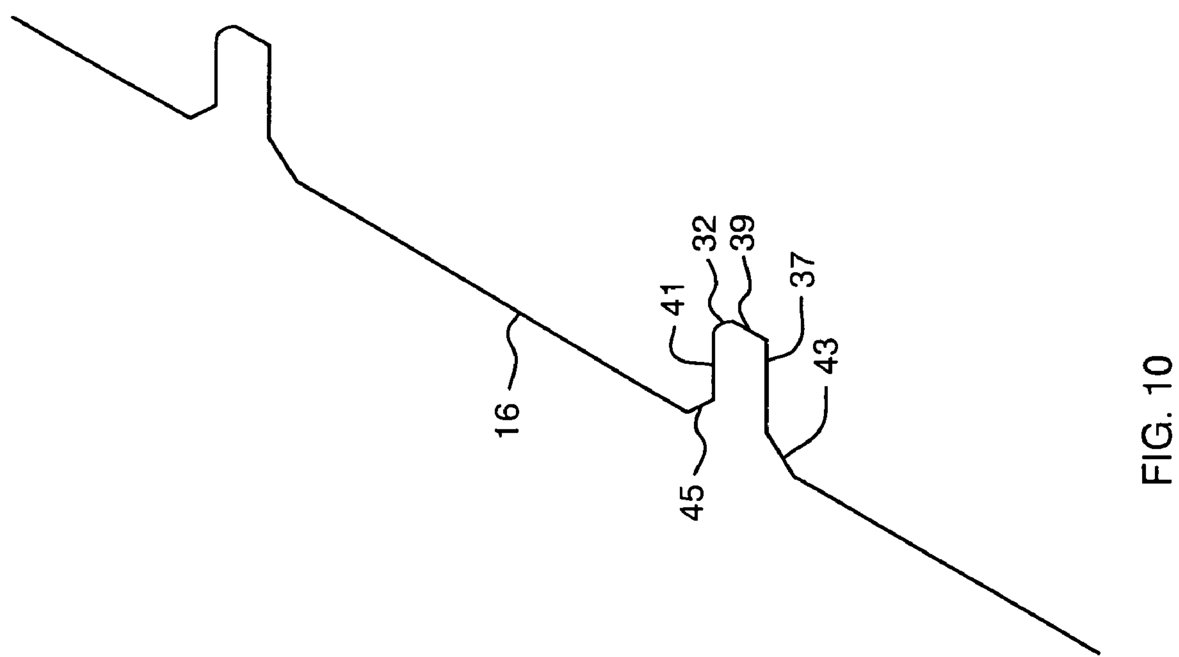
FIG. 10 shows a sectional view of an "E" groove or angled slot with double chamfer configuration for a 48 to 64 degree wedge according to yet another embodiment of the invention.

FIGS. 8-10 illustrate yet another groove configuration, an angled slot with double chamfer configuration, and more particularly, an "E" version of said angled slot with double chamfer configuration for all golf clubs including irons, drivers, woods and particularly wedges (48-64 degrees) according to one embodiment of the present invention. Said configuration comprises at least one angular slot or a series of angular slots cut into the club face 16. Each angular slot is formed by three surfaces, first surface 27, second surface 31 and third surface 29. Said first surface 27 and said second surface 31 connect to the club face 16 via chamfered edges 33 and 35 respectively. Third surface 29 runs either parallel or non-parallel to the club face 16 and connects to surface 31 at a rounded corner 32 having an effective radius between 0.0025 and 0.0075 inch with a preferred radius of 0.005 inch. The outer edges of surfaces 27 and 31 in conjunction with chamfered edges 33 and 35 interface to form a gripping edge which imparts backspin on the ball.

The angle of the first chamfered edge 33 with respect to the first surface 27 is effective for improving the backspin (i.e., increasing backspin) imparted to a golf ball in the ranges of: 0 to 180 degrees, 20 to 160 degrees, 40 to 140 degrees, 60 to 120 degrees, 80 to 100 degrees, 0 to 90 degrees and 90 to 180 degrees for all golf clubs including irons, drivers, woods and wedges. More particularly, the effective range is 10 to 30 degrees. Even more particularly, the effective ranges are 19-21 degrees, the most preferable angle therein being about 20 degrees to maximize the performance of a 52-degree wedge (FIG. 8), 16-18 degrees, the most preferable angle therein being about 17 degrees to maximize the performance of a 56-degree wedge (FIG. 9), and 14-16 degrees, the most preferable angle therein being about 15 degrees to maximize the performance of a 60-degree wedge (FIG. 10).

The angle of the second chamfered edge 35 with respect to the second surface 31 is effective for improving the backspin (i.e., increasing backspin) imparted to a golf ball in the ranges of: 0 to 180 degrees, 20 to 160 degrees, 40 to 140 degrees, 60 to 120 degrees, 80 to 100 degrees, 0 to 90 degrees and 90 to 180 degrees. More particularly, the effective range is 20 to 110 degrees for all golf clubs including irons, drivers, woods and wedges. Even more particularly, the effective range is 77-87 degrees, the most preferable angle therein being about 82 degrees to maximize the performance of a 52-degree wedge (FIG. 8), 60-70 degrees, the most preferable angle therein being about 65 degrees to maximize the performance of a 56-degree wedge (FIG. 9), and 40-50 degrees, the most preferable angle therein being about 45 degrees to maximize the performance of a 60-degree wedge (FIG. 10).

Said first surface 27 and said second surface 31 are not both parallel to each other and perpendicular to the club face 16 simultaneously. Additionally, the distance between surfaces 27 and 31 is between 0.005 and 0.015 inch with a preferred distance of 0.01 inch, while the distance between the chamfered edges 33 and 35 at the club face 16 (i.e., the opening or width of the angled slot) ranges between 0.015 and 0.055 inch; most particularly said distance is at a maximum of 0.035 inch. Furthermore, the depth of each grove in said "E" configuration can range from 0.01 inch to 0.03 inch, with a preferable depth of 0.02 inch. Said "E" configuration can be cut using a custom ground woodruff cutter.

It will be appreciated that the lengths, angles and radii of the modified groove configurations described above can be varied to create different spin characteristics of a golf ball when struck by a golf club employing any of the groove configurations of the present invention. All grooves can be combined in different combinations with any other type of groove to modify the clubs performance.

While various preferred embodiments have been shown and described, it will be understood that the present invention is by no means limited to the particular constructions herein disclosed and/or depicted in the drawings, but also comprises any modifications or equivalents within the spirit and scope of the disclosure.

Having thus described my invention, what I claim as new and desire to secure by Letters Patent of the United states is:

I claim:

1. A golf club comprising:

a head portion having a toe area and a heel area;

a shaft portion;

a hosel portion connecting the head portion to the shaft portion;

a club face; and at least one slot formed across the club face, the at least one slot comprising a first surface, a second surface, a third surface, a first chamfered edge connecting said first surface to the club face, and a second chamfered edge connecting said second surface to the club face, wherein said first surface and said second surface are parallel to each other and perpendicular to the club face.

2. The golf club according to claim 1, wherein the first chamfered edge connects to the first surface in the range of 0.00125 to 0.00875 inch below the club face.

3. The golf club according to claim 2, wherein the first chamfered edge connects to the first surface in the range of 0.0025 to 0.0075 inch below the club face.

4. The golf club according to claim 3, wherein the first chamfered edge connects to the first surface in the range of 0.00375 to 0.00625 inch below the club face.

5. The golf club according to claim 1, wherein the distance between the first surface and the second surface is about 0.01 to 0.026 inch.

6. The golf club according to claim 1, wherein a width of the slot measured at the club face ranges from 0.015 to 0.055 inch.

7. The golf club according to claim 1, wherein the maximum depth of the slot measured from the club face ranges from 0.01 to 0.03 inch.

8. The golf club according to claim 1, wherein the first chamfered edge connects to the first surface in the range of 0.00125 to 0.00875 inch below the club face, the distance between the first surface and the second surface is about 0.01 to 0.026 inch, a width of the slot measured at the club face ranges from 0.015 to 0.055 inch, and the maximum depth of the slot measured from the club face ranges from 0.01 to 0.03 inch.

9. The golf club according to claim 1, wherein the first chamfered edge connects to the first surface in the range of 10 to 40% of the maximum depth of the slot measured from the club face.

10. The golf club according to claim 9, wherein the first chamfered edge connects to the first surface in the range of 20-30% of the maximum depth of the slot measured from the club face.

11. The golf club according to claim 1, wherein the first chamfered edge connects to the first surface in the range of 0.005 to 0.015 inch below the club face.

12. The golf club according to claim 11, wherein the first chamfered edge connects to the first surface in the range of 0.00625 to 0.01375 inch below the club face.

13. The golf club according to claim 12, wherein the first chamfered edge connects to the first surface in the range of 0.0075 to 0.0125 inch below the club face.

14. The golf club according to claim 13, wherein the first chamfered edge connects to the first surface in the range of 0.00875 to 0.01125 inch below the club face.

15. The golf club according to claim 1, wherein the first chamfered edge connects to the first surface in the range of 40 to 70% of the maximum depth of the slot measured from the club face.

16. The golf club according to claim 15, wherein the first chamfered edge connects to the first surface in the range of 45-55% of the maximum depth of the slot measured from the club face.

17. The golf club according to claim 1, wherein the third surface is parallel to the club face.

18. The golf club according to claim 1, wherein the golf club is a 48-64 degree wedge.

19. The golf club according to claim 1, wherein the slot is formed using a milling process, a stamping process, or a molding process.

* * * * *